(12) United States Patent
Dilmaghani et al.

(10) Patent No.: US 9,426,054 B2
(45) Date of Patent: *Aug. 23, 2016

(54) ALIASING OF NAMED DATA OBJECTS AND NAMED GRAPHS FOR NAMED DATA NETWORKS

(71) Applicant: International Business Machines Corporation, Armonk, NY (US)

(72) Inventors: Raheleh B. Dilmaghani, Elmsford, NY (US); Bong Jun Ko, Harrington Park, NJ (US); Kang-Won Lee, Nanuet, NY (US); Vasileios Pappas, Elmsford, NY (US); Ramya Raghavendra, White Plains, NY (US); Yang Song, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 366 days.

This patent is subject to a terminal disclaimer.

(21) Appl. No.: 13/790,962

(22) Filed: Mar. 8, 2013

(65) Prior Publication Data

US 2014/0164643 A1 Jun. 12, 2014

Related U.S. Application Data

(63) Continuation of application No. 13/707,120, filed on Dec. 6, 2012.

(51) Int. Cl.
*G06F 15/173* (2006.01)
*H04L 12/751* (2013.01)
(52) U.S. Cl.
CPC ..................... *H04L 45/08* (2013.01)

(58) Field of Classification Search
CPC ...................................................... H04L 45/08
See application file for complete search history.

(56) References Cited

U.S. PATENT DOCUMENTS

| | | | |
|---|---|---|---|
| 6,484,204 B1 | 11/2002 | Rabinovich | |
| 6,563,454 B2 | 5/2003 | Akasu | |
| 7,339,937 B2 | 3/2008 | Mitra et al. | |
| 2002/0143524 A1* | 10/2002 | O'Neil | G06F 17/271 704/9 |
| 2004/0111432 A1* | 6/2004 | Adams, Jr. | G06F 17/30256 |
| 2005/0187951 A1* | 8/2005 | Chen | G06F 17/30696 |
| 2006/0123045 A1* | 6/2006 | Chang | G06F 17/2881 |
| 2006/0165053 A1* | 7/2006 | Bhatnagar | H04L 67/02 370/351 |
| 2007/0067280 A1 | 3/2007 | Zhou et al. | |
| 2007/0198480 A1 | 8/2007 | Hogue et al. | |

(Continued)

OTHER PUBLICATIONS

Zhang et al., Named Data Networking (NDN) Project, Oct. 31, 2010, pp. 2~4.*

(Continued)

*Primary Examiner* — Hee Soo Kim
(74) *Attorney, Agent, or Firm* — Scully, Scott, Murphy & Presser, P.C.; Mercedes Hobson, Esq.

(57) ABSTRACT

Systems, methods and computer program products for aliasing of named data objects (in named data networks) and entities for named data networks (e.g., named graphs for named data networks). In various examples, aliasing of named data objects may be implemented in one or more named data networks in the form of systems, methods and/or algorithms. In other examples, named graphs may be implemented in one or more named data networks in the form of systems, methods and/or algorithms.

13 Claims, 10 Drawing Sheets

(56) References Cited

U.S. PATENT DOCUMENTS

2008/0183774 A1 7/2008 Otani et al.
2009/0192996 A1 7/2009 Guo et al.
2009/0287835 A1 11/2009 Jacobson

OTHER PUBLICATIONS

U.S. Office Action dated Feb. 26, 2015 issued in U.S. Appl. No. 13/707,120.
U.S. Office Action dated Jun. 30, 2015 issued in U.S. Appl. No. 13/707,120.
DiMarco, TT. et al., "Use of Alias Names to Reference Objects", IP.com, Mar. 30, 2005, pp. 297-302.
Spelce, DC. et al., "Method for Browsing Aliases and Network Names", IP.com, Mar. 30, 2005, pp. 51-52.
Alimi, R. et al., "A Survey of In-Network Storage Systems", IP.com, Dec. 4, 2011, pp. 1-44.
Song, Y. et al., "Power-aware Traffic Engineering with Named Data Networking", Mobile Ad-hoc and Sensor Networks (MSN), 2011 Seventh International Conference, Dec. 16-18, 2011, pp. 289-296.
http://en.wikipedia.org/wiki/Aliasing_(computing), "Aliasing (computing)", Jul. 31, 2012.
http://publib.boulder.ibm.com/infocenter/iseries/v5r4/topic/ddp/rbal1specifyn.htm, "Specifying a relational database alias name", printed Jul. 31, 2012.
Chen et al., "Survey on Routing in Data Centers: Insights and Future Directions", IEEE Network, Jul./Aug. 2011, pp. 2-6.
"BRMS Networking: Relational Database Directory Entries", Document No. 547019463, pp. 1-6.

\* cited by examiner

ALIASING OF NAMED DATA OBJECTS AND NAMED GRAPHS FOR NAMED DATA NETWORKS

RELATED APPLICATION

This application is a continuation of U.S. Ser. No. 13/707,120, filed Dec. 6, 2012, the entire contents of which are incorporated herein by reference.

BACKGROUND

The present disclosure relates generally to the field of aliasing of named data objects (in named data networks).

The present disclosure also relates generally to the field of entities for named data networks (e.g., named graphs for named data networks).

In various examples, aliasing of named data objects may be implemented in one or more named data networks in the form of systems, methods and/or algorithms.

In other examples, named graphs may be implemented in one or more named data networks in the form of systems, methods and/or algorithms.

DESCRIPTION OF RELATED ART

Aliasing is provided in certain programming languages. Such aliasing typically describes a situation in which a data location in memory can be accessed through different symbolic names in the program. Thus, modifying the data through one name implicitly modifies the values associated to all aliased names, which may not be expected by the programmer Aliasing is also provided in certain relational databases (for example: an alternate name for a relational database; identification by communications protocol, hostname and database instance; multiple entries for a single relational database on a remote system).

Named Data Networking (sometimes referred to herein as "NDN") is a paradigm in which requests (e.g., from a consumer or broker) are routed to a data entity (or data object) using a name such as, for example, alphanumeric characters (in contrast to machine addresses in traditional IP networks). In the NDN paradigm, a user (or consumer) requests named data from a data producer (such a request is sometimes called "interest"). The user's request is forwarded towards the data producer by one or more routers (possibly through one or more NDN brokers) based on the name of the data in the request. The data producer then responds with the requested data.

FIG. 1 shows an example of a conventional named data networking architecture 100. As seen in this example, consumers 101A, 101B and 101C interact with producers 103A, 103B and 103C via brokers 105A, 105B, 105C, 105D, 105E, 105F, 105G and/or 105H.

Still referring to FIG. 1, communication (e.g., requests, responses, data objects) between and among the various entities (indicated by the solid lines between the entities) may be bi-directional. Further, the communication may be carried out via the Internet, an intranet, a local area network, a wide area network and/or any other desired communication channel(s).

Of note, while FIG. 1 shows the various entities communicating, it is to be understood that this FIG. 1 is actually referring to communication by computer system(s) or the like that are owned, leased, operated, used by, in the possession of and/or controlled by each of the entities.

In such an NDN architecture 100 a single object can be referred to in multiple ways. In this regard, a requestor (e.g., user, consumer, broker) may not have explicit knowledge of names of a given data object. As a result, data object routing may be performed using suboptimal routes (e.g., by not taking advantage of certain caches).

SUMMARY

The present disclosure relates generally to systems, methods and computer program products for aliasing of named data objects (in named data networks).

The present disclosure also relates generally to the field of named graphs (for named data networks).

In one embodiment, a method implemented in a computer system for aliasing data objects in a named data network including a plurality of routers, wherein at least a first one of the data objects is associated with at least a first alias, is provided, the method comprising: detecting by a first one of the routers a content of at least one named data object request for the first data object and a content of at least one response to the named data object request; and implicitly learning by the first router the first alias based at least in part upon the detected content of at least one of the request and the response.

In another embodiment, a method implemented in a computer system network for data object routing based on a named data object request in a named data network including a plurality of routers is provided, the method comprising: receiving at a first one of the routers the named data object request; determining by the first router if the data object named by the named data object request is in a cache of the first router; if the data object named by the named data object request is in the cache of the first router, responding by the first router with the data object; if the data object named by the named data object request is not in the cache of the first router, determining by the first router if an alias copy of the data object named by an alias associated with the named data object is in the cache of the first router; if the data object named by the named data object request is not in the cache of the first router and if an alias copy of the data object named by an alias associated with the named data object is in a cache of the first router, responding by the first router with the alias copy; if the data object named by the named data object request is not in the cache of the first router and if an alias copy of the data object named by an alias associated with the named data object is not in the cache of the first router, determining by the first router if a location of an alias copy of the data object at a second one of the routers is known; and if the data object named by the named data object request is not in the cache of the first router and if an alias copy of the data object named by an alias associated with the named data object is not in the cache of the first router and if the location of the alias copy of the data object at the second one of the routers is known, routing by the first router the named data object request towards the location of the second router.

In another embodiment, a method implemented in a computer system for accessing data objects in a named data network including a plurality of routers is provided, the method comprising: receiving at a first one of the routers a named data object request identifying a first one of the data objects; receiving at the first one of the routers at least a portion of a named graph, wherein the named graph identifies associated data objects, wherein the associated data objects include the first data object, wherein the named graph specifies a node corresponding to each of the identified associated data objects, and wherein each node represents a location at one of the routers; retrieving by the first router the first data object; and retrieving by the first router, based at least in part upon the received named graph, at least one additional identified associated data object when the first data object is retrieved.

In another embodiment, a computer readable storage medium, tangibly embodying a program of instructions executable by the computer for aliasing data objects in a named data network including a plurality of routers, wherein at least a first one of the data objects is associated with at least a first alias, is provided, the program of instructions, when executing, performing the following steps: detecting by a first one of the routers a content of at least one named data object request for the first data object and a content of at least one response to the named data object request; and implicitly learning by the first router the first alias based at least in part upon the detected content of at least one of the request and the response.

In another embodiment, a computer readable storage medium, tangibly embodying a program of instructions executable by the computer for data object routing based on a named data object request in a named data network including a plurality of routers is provided, the program of instructions, when executing, performing the following steps: receiving at a first one of the routers the named data object request; determining by the first router if the data object named by the named data object request is in a cache of the first router; if the data object named by the named data object request is in the cache of the first router, responding by the first router with the data object; if the data object named by the named data object request is not in the cache of the first router, determining by the first router if an alias copy of the data object named by an alias associated with the named data object is in the cache of the first router; if the data object named by the named data object request is not in the cache of the first router and if an alias copy of the data object named by an alias associated with the named data object is in a cache of the first router, responding by the first router with the alias copy; if the data object named by the named data object request is not in the cache of the first router and if an alias copy of the data object named by an alias associated with the named data object is not in the cache of the first router, determining by the first router if a location of an alias copy of the data object at a second one of the routers is known; and if the data object named by the named data object request is not in the cache of the first router and if an alias copy of the data object named by an alias associated with the named data object is not in the cache of the first router and if the location of the alias copy of the data object at the second one of the routers is known, routing by the first router the named data object request towards the location of the second router.

In another embodiment, a computer readable storage medium, tangibly embodying a program of instructions executable by the computer for accessing data objects in a named data network including a plurality of routers is provided, the program of instructions, when executing, performing the following steps: receiving at a first one of the routers a named data object request identifying a first one of the data objects; receiving at the first one of the routers at least a portion of a named graph, wherein the named graph identifies associated data objects, wherein the associated data objects include the first data object, wherein the named graph specifies a node corresponding to each of the identified associated data objects, and wherein each node represents a location at one of the routers; retrieving by the first router the first data object; and retrieving by the first router, based at least in part upon the received named graph, at least one additional identified associated data object when the first data object is retrieved.

In another embodiment, a computer-implemented system for aliasing data objects in a named data network including a plurality of routers is provided, the system comprising: a first router, wherein: the first router is configured to detect a content of at least one named data object request for a first data object and a content of at least one response to the named data object request; and the first router is configured to implicitly learn the first alias based at least in part upon the detected content of at least one of the request and the response.

In another embodiment, a computer-implemented system for data object routing based on a named data object request in a named data network including a plurality of routers is provided, the system comprising: a first router, wherein: the first router is configured to receive the named data object request; the first router is configured to determine if the data object named by the named data object request is in a cache of the first router; the first router is configured to respond with the data object named by the named data object request if the data object named by the named data request is in the cache of the first router; the first router is configured to determine if an alias copy of the data object named by an alias associated with the named data object is in a cache of the first router if the data object named by the named data object request is not in the cache of the first router; the first router is configured to respond with the alias copy if the data object named by the named data object request is not in the cache of the first router and if an alias copy of the data object named by an alias associated with the named data object is in the cache of the first router; the first router is configured to determine if a location of an alias copy of the data object at a second one of the routers is known if the data object named by the named data object request is not in the cache of the first router and if an alias copy of the data object named by an alias associated with the named data object is not in the cache of the first router; and the first router is configured to route the named data object request towards the location of the second router if the data object named by the named data object request is not in the cache of the first router and if an alias copy of the data object named by an alias associated with the named data object is not in the cache of the first router and if the location of the alias copy of the data object at a second one of the routers is known.

In another embodiment, a computer-implemented system for accessing data objects in a named data network including a plurality of routers is provided, the system comprising: a first router, wherein: the first router is configured to receive a named data object request identifying a first one of the data objects; the first router is configured to receive at least a portion of a named graph, wherein the named graph identifies associated data objects, wherein the associated data objects include the first data object, wherein the named graph specifies a node corresponding to each of the identified associated data objects, and wherein each node represents a location at one of the routers; the first router is configured to retrieve the first data object; and the first router is configured to retrieve, based at least in part upon the received named graph, at least one additional identified associated data object when the first data object is retrieved.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

Figure 1:
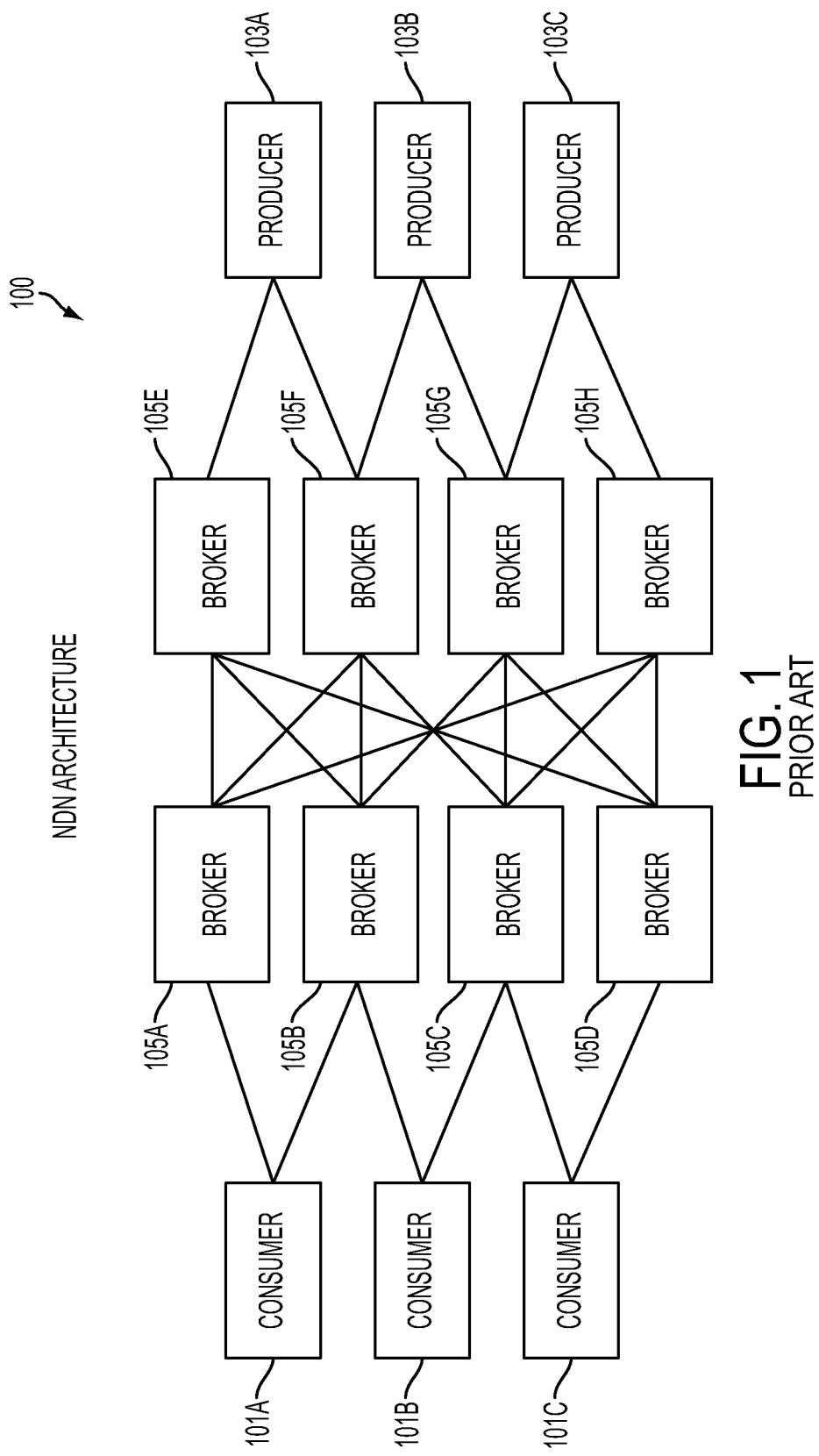
FIG. 1 depicts a block diagram of a conventional named data architecture.

For the purposes of description, the term "data object" is intended to refer to a sequence of bytes of a given length. Such a data object can be, for example, a single addressable content that a user can request. In other examples, a data object can be a segment of a file, or a file, or a collection of files, or a sequence of bytes that is generated dynamically. In other examples, a data object can be an audio file, a video file or a web page. In another example, a data object can be a part of a large file (e.g., a movie file can be broken down into multiple parts, each of which can be individually addressed and downloaded).

For the purposes of description, the term "named graph" is intended to refer to a graph with data entities and/or structures comprising a plurality of named data objects and the relationships between the named data objects.

As described herein, mechanisms are provided to create, maintain and resolve relationships between named data objects in an NDN. These relationships may be static (in which case the relationships can be preconfigured) and/or dynamic (and in which case the relationships can, for example, be learned by the network). One example of such relationship between named objects is aliases, i.e., multiple ways by which the same data object is addressed. For example, a user may request to download all records pertaining to a person by the name of Alice. Another user may want to download the same data, i.e. records of Alice, but may refer to Alice as Bob's manager. Various embodiments provide for the creation, maintenance and resolution of such named object relations (alias being an example) by the NDN for efficient retrieval.

As described herein, various embodiments enable dynamic, alias-aware routing in which: NDN brokers infer data object aliases in a dynamic manner and brokers forward a request if the requested data object (or data object alias) is not present in the cache of the broker.

As described herein, various embodiments provide for using alias information to perform routing/forwarding in named data networks (this enables the network to observe and infer data object aliases). In various examples, such embodiments are not end-point driven, but executed at NDN brokers.

As described herein, in various embodiments NDN brokers observe and infer a syntactic/semantic relationship of names, that is, "alias". One example static alias for "Alice" is "Charlie's daughter". One example dynamic alias for "Alice" is "Bob's manager". One example, semantic alias for the "weather in Hawthorne, N.Y." is "weather in zip code 10532".

As described herein, in various embodiments data objects are cached at a broker entity in an alias table structure. In one example, future requests are not forwarded if a request can be satisfied with a named alias. Further, routing may be performed based not just on the requested data object name, but the routers' knowledge of data object aliases.

Reference will now be made to various examples of the building of alias tables (e.g., in a memory and/or a cache). In this regard, NDN brokers/routers can build alias tables in one of several ways: (a) Static—publishers register data object aliases with one or more name management servers (after which the data object aliases are propagated for example, to form a table); (b) Data signatures—brokers observe data object requests/responses and build aliases for data objects with the same signatures; and (c) Normalization—brokers use query normalization to identify the alias of desired data, e.g., using boolean expression simplification.

Reference will now be made to one general example of routing and forwarding. In this example, when a data object request arrives: (a) if a broker has the data object or its alias in its associated cache then the data object is forwarded to the requester—if not then; (b) if the broker has knowledge of an alias then the broker routes the request based on the alias to the nearest data object location (the broker also appends alias information to propagate the alias information to other brokers)—if not then; (c) if the broker does not have the data object in cache or alias information then the broker forwards the request to the next hop on the route.

In one example, a switching mechanism may determine the next hop on the route. In this example, the switches are configured to forward packets to the next hop switches based on the destination address on the packet. The end-end path is determined by the routing protocol used in the Data Center Network ("DCN"). A survey of existing mechanisms is presented in the following paper: http://www.cs.cmu.edu/~xzhang1/doc/datacenter-routing.pdf.

Figure 2:
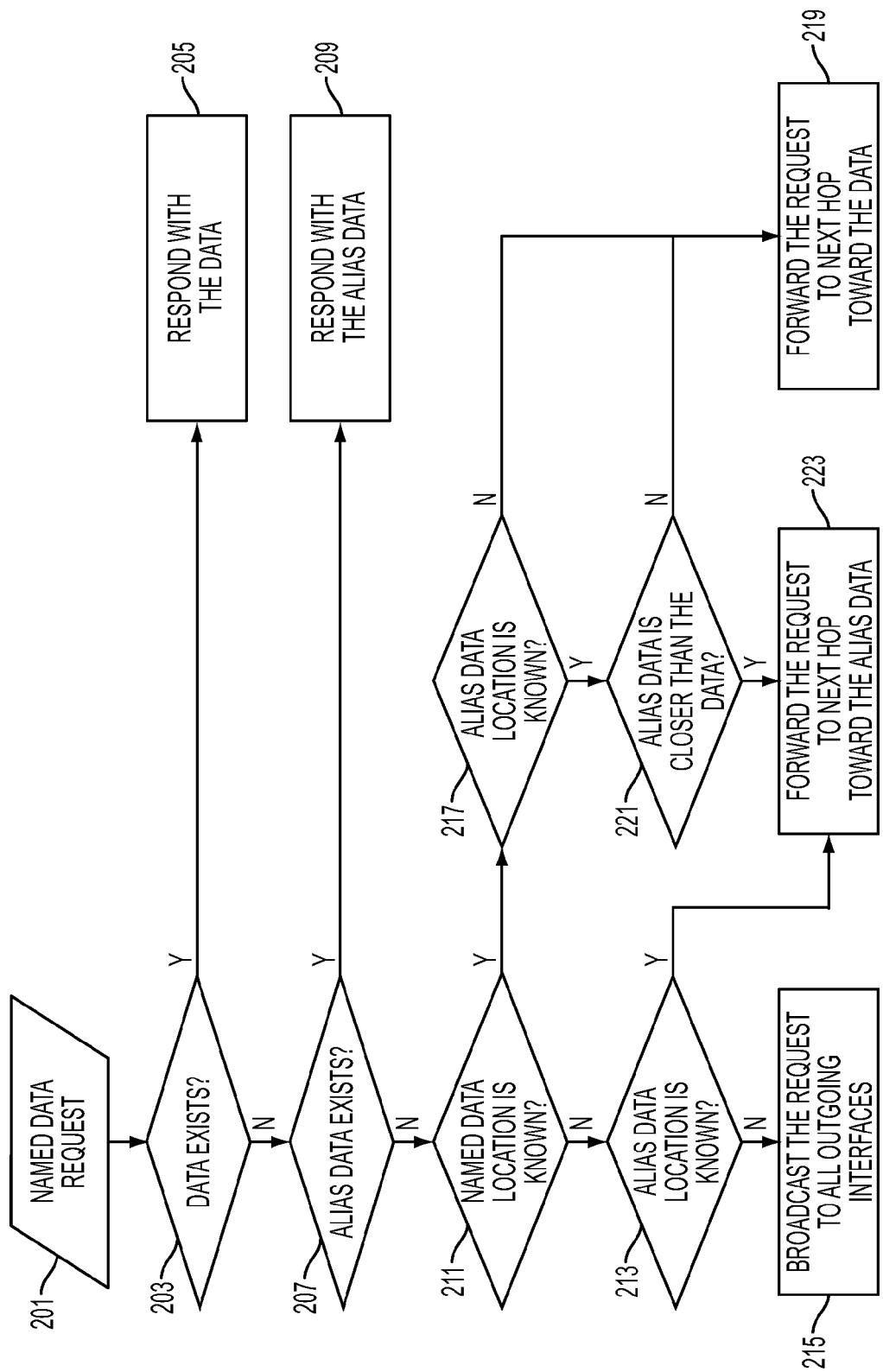
FIG. 2 depicts a flowchart of routing and forwarding according to an embodiment of the present invention.

Referring now to FIG. 2, reference will now be made a more specific example of routing and forwarding of requests, responses and/or data objects between and/or among consumers, brokers and/or producers. As seen in this example, a named data request (for a data object) is made by a consumer and received at a broker (see call-out number 201). A decision is made (e.g., by a broker/router) according to whether the requested data object (referred to in the figure simply as "data") exists at the broker/router (see call-out number 203). If the answer is "yes", then the broker/router responds with the data (see call-out number 205). If the answer is "no", then a decision is made (e.g., by the broker/router) whether the alias data exists at the broker/router (see call-out number 207). If the answer at call-out number 207 is "yes", then the broker/router responds with the alias data (see call-out number 209).

Referring back now to call-out number 207, if the answer is "no", then a decision is made (e.g., by the broker/router) whether a location of the named data is known (see call-out number 211). If the answer at call-out number 211 is "no", then a decision is made (e.g., by the broker/router) whether a location of the alias data is known (see call-out number 213). If the answer at call-out number 213 is "no", a broadcast of the named data request to all outgoing interfaces is made (e.g., by the broker/router) (see call-out number 215).

Referring back now to call-out number 211, if the answer is "yes", then a decision is made (e.g., by the broker/router)

whether a location of the alias data is known (see call-out number 217). If the answer at call-out number 217 is "no", then the named data request is forwarded (e.g., by the broker/router) to the next hop toward the data (see call-out number 219). If the answer at call-out number 217 is "yes", then a decision is made (e.g., by the broker/router) whether the alias data is closer than the original data (see call-out number 221). In this context, "closer" refers to the routing distance. For example, if hop count is the metric used for routing, then an alias that is k hops away is closer than an object that is k+1 hops away. If the answer at call-out number 221 is "no", then the named data request is forwarded (e.g., by the broker/router) to the next hop toward the data (see call-out number 219). If the answer at call-out number 221 is "yes", then the named data request is forwarded (e.g., by the broker/router) to the next hop toward the alias data (see call-out number 223).

As described herein, mechanisms are provided for creating a named graph (discussed in more detail below). In one embodiment, a client application requests a named data object, the network retrieves not only the requested data object, but also the named graph (partially or in its entirety). As an example, when a browser requests a webpage, a page with several embedded URL's could be downloaded, and the browser subsequently issues requests for each of these data objects. In one embodiment, the network automatically retrieves the named graph (without the browser application's assistance), thus enabling faster response times and caching of data objects and relationships in one or more intermediate routers.

As described herein, a new entity is introduced into the NDN paradigm, namely named graphs. A named graph comprises named data objects along with the relationships that exist between the named data objects. There could be several techniques to create named graphs, a number of which are discussed in more detail below. The named graphs may be created in a static manner and/or created and updated in a dynamic manner in the NDN.

One specific example of a named graph is the one resulting from one-one correspondences between named objects and their aliases. A named object could have one or more aliases based on the syntactic and semantic contexts. The data publisher would publish canonical object names along with a list of aliases, which then get resolved by a naming service (see, e.g. controller 1050 of FIG. 10) that exists in the NDN architecture. As per the prior example regarding Alice and Bob, a data publisher could publish Alice's records with a list of aliases such as Bob's manager and Charlie's employee. When a user makes a request for Bob's manager's records, a name resolution service (see, e.g. controller 1050 of FIG. 10) would resolve this request to Alice's records. Intermediate NDN routers that forwarded the request and response learn about these aliases so that these router caches can satisfy future requests.

A named graph could also (or in the alternative) be constructed from dependencies and/or relationships that exist between named data objects. The dependencies and/or relationships could be explicit and/or implicit. In one specific example, a webpage with embedded URLs can form a (static) named graph. In another specific example, a large data object (e.g., a movie video) available as multiple parts could form a named graph. Another specific example of a named graph is the data objects that belong to a tree in a hierarchical naming scheme. Apart from such explicit relationships, there could be implicit (and potentially short-term) relationships between data objects that can be observed (e.g., by a router) based on requests for named data objects (named graphs may be created and/or updated in a dynamic fashion based upon such relationships). For example, routers can observe the named data object requests and responses, and collect the relationship between them in terms of their proximity in time of occurrence, to build a graph of the relationship between named data objects that represents the likelihood of co-occurrence between different named data.

When a client makes a request for a data object, the request gets routed to the producer, and based on the routing protocol deployed in the network, the data object gets retrieved from an intermediate router that has the data object in the cache. Using the named graph mechanism described herein, a router would not only respond with the requested data object but also with the named graph (partially or in its entirety).

Figure 3:
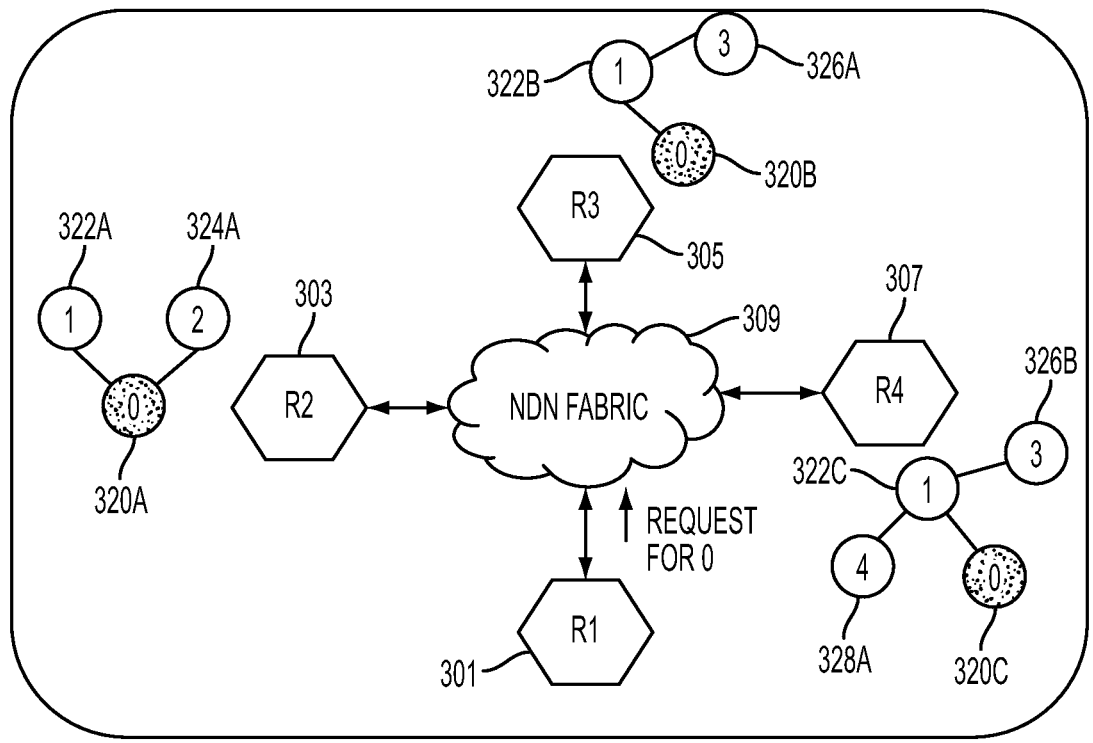
FIG. 3 depicts a block diagram related to a named graph according to an embodiment of the present invention.
Figure 4:
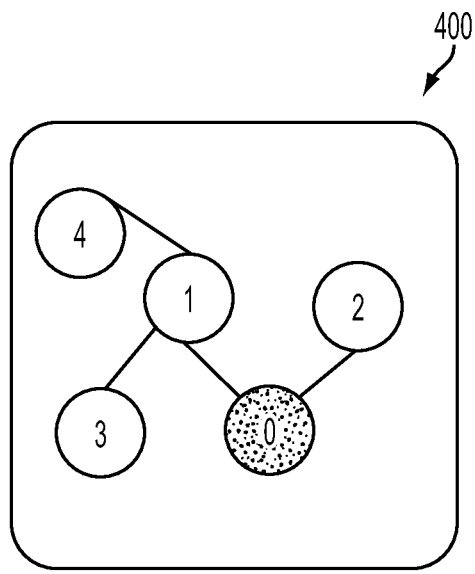
FIG. 4 depicts a block diagram related to a named graph according to an embodiment of the present invention.

Reference will now be made to FIGS. 3 and 4. In the example shown in FIG. 3, there are routers R1, R2, R3 and R4 (see call-out numbers 301, 303, 305 and 307). The routers R1, R2, R3 and R4 communicate via NDA fabric, or architecture (see call-out number 309). Further various data objects are located in the caches of each of the routers. In particular, in this example, there is a data object 0 at each of routers R2, R3 and R4 (see call-out numbers 320A, 320B and 320C). Further, there is a data object 1 at each of routers R2, R3 and R4 (see call-out numbers 322A, 322B and 322C). Further still, there is a data object 2 at router R2 (see call-out number 324A). Further still, there is a data object 3 at each of routers R3 and R4 (see call-out numbers 326A and 326B). Further still, there is a data object 4 at router R4 (see call-out number 328A).

Still referring to FIG. 3, it is seen that in this example, router R1 has a request for data object 0 that is not present in the local cache of router R1 (in one example, this request may have been broadcast to all routers). The routing protocol of R1 returns with one or more paths on which the data object 0 can be retrieved. When R1 issues a request for data object 0 on a selected path each reachable router returns a named graph for data object 0 present in its cache. If a router cannot route the entire contents of the named graph, the router creates a subgraph of the named graph and routes the components of the subgraph. At the end of the request on the selected path, R1 has the same named graph as the router that served it data (example: 0, 1, 2 from R2), but as further requests are made to related data objects (e.g., 1, 3, 4), R1 builds on the named graph for data object 0 in a dynamic fashion such as shown in FIG. 4 (which depicts an example dynamically created named graph 400).

Further, routing decisions could be influenced by the named graph. For example (referring back to FIG. 3), when a request for data object 0 is made by R1, R1 has the choice of retrieving data object 0 from R2, R3 or R4. A simple decision could be made by R1 such as retrieving data object 0 from R2 since R1 can obtain a "strongly related data object". Another decision policy would be, for example, to fetch data object 0 from both R2 and R3 to get more related components and achieve load balancing.

In the context of the discussion herein, the meaning of a "strongly related data object" is as follows. Suppose there are two objects 0 and 1. If, under the circumstance that object 0 is fetched, there is a high probability that object 1 will also be fetched later, e.g., sequential data for a movie, then these two objects are "strongly related". For example, a probability threshold of 0.8 may be used to cut off the strongly related data object pairs from those are not. Such information can be obtained, for example, through application specific predictive analysis and/or history information.

Figure 5:
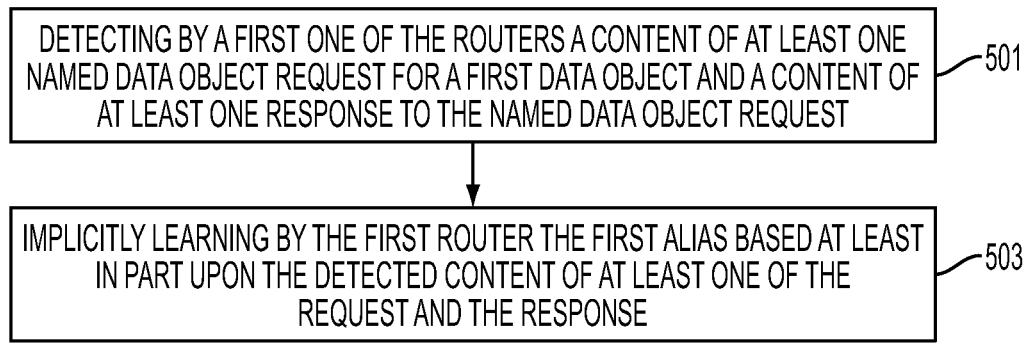
FIG. 5 depicts a flowchart of a method according to an embodiment of the present invention.

Referring now to FIG. 5, a method implemented in a computer system (or network) for aliasing data objects in a named data network is shown. As seen in this FIG. 5, the computer system may include a plurality of routers and at least a first one of the data objects may be associated with at least a first alias. Further, as seen in this FIG. 5, the method comprises: Step 501—detecting by a first one of the routers a content of at least one named data object request for the first data object and a content of at least one response to the named data object request; and Step 503—implicitly learning by the first router the first alias based at least in part upon the detected content of at least one of the request and the response.

In one specific example, the learning by the first router the first alias may be based at least in part upon the detected content of both of the request and the response.

In one example, any steps may be carried out in the order recited or the steps may be carried out in another order.

Figure 6A:
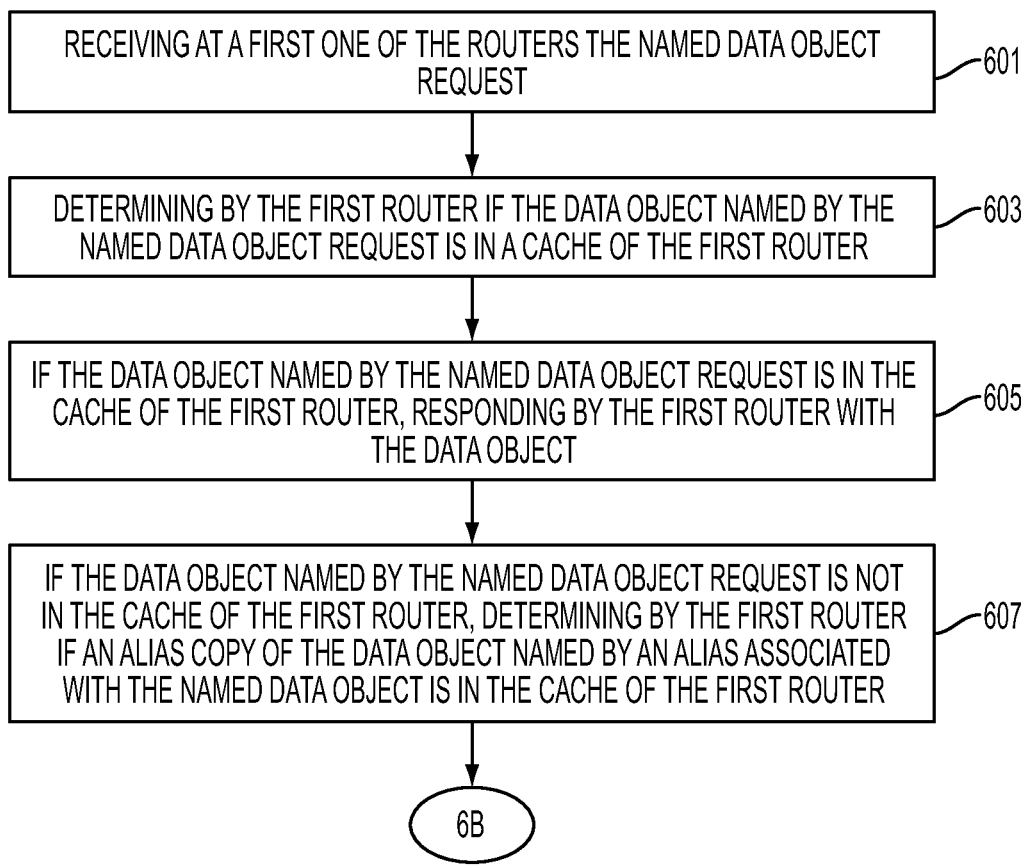
FIGS. 6A and 6B depict a flowchart of a method according to an embodiment of the present invention.
Figure 6B:
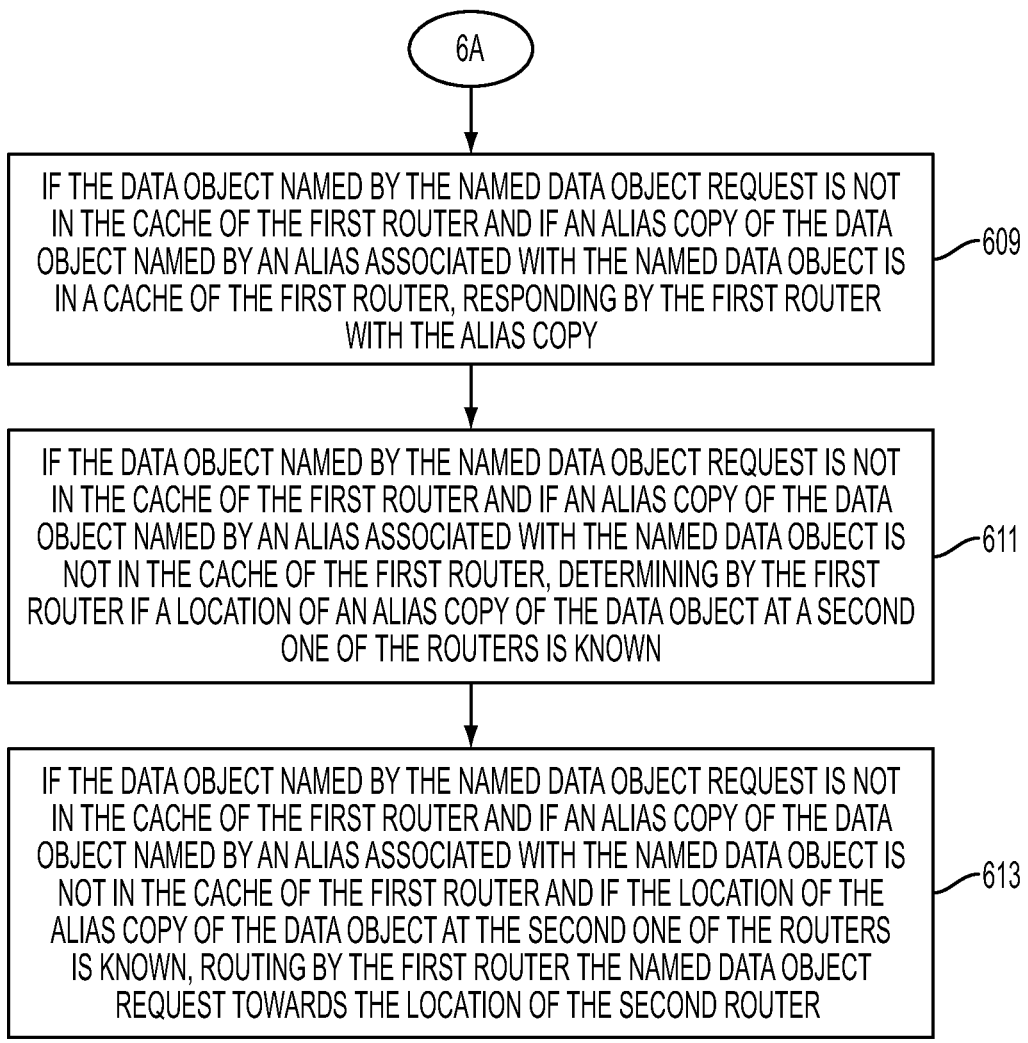

Referring now to FIGS. 6A and 6B, a method implemented in a computer system (or network) for data object routing based on a named data object request in a named data network including a plurality of routers is shown. As seen in these FIGS. 6A and 6B, the method comprises: Step 601—receiving at a first one of the routers the named data object request; Step 603—determining by the first router if the data object named by the named data object request is in a cache of the first router; Step 605—if the data object named by the named data object request is in the cache of the first router, responding by the first router with the data object; Step 607—if the data object named by the named data object request is not in the cache of the first router, determining by the first router if an alias copy of the data object named by an alias associated with the named data object is in the cache of the first router; Step 609—if the data object named by the named data object request is not in the cache of the first router and if an alias copy of the data object named by an alias associated with the named data object is in a cache of the first router, responding by the first router with the alias copy; Step 611—if the data object named by the named data object request is not in the cache of the first router and if an alias copy of the data object named by an alias associated with the named data object is not in the cache of the first router, determining by the first router if a location of an alias copy of the data object at a second one of the routers is known; Step 613—if the data object named by the named data request is not in the cache of the first router and if an alias copy of the data object named by an alias associated with the named data object is not in the cache of the first router and if the location of the alias copy of the data object at the second one of the routers is known, routing by the first router the named data object request towards the location of the second router.

In one example, any steps may be carried out in the order recited or the steps may be carried out in another order.

Figure 7:
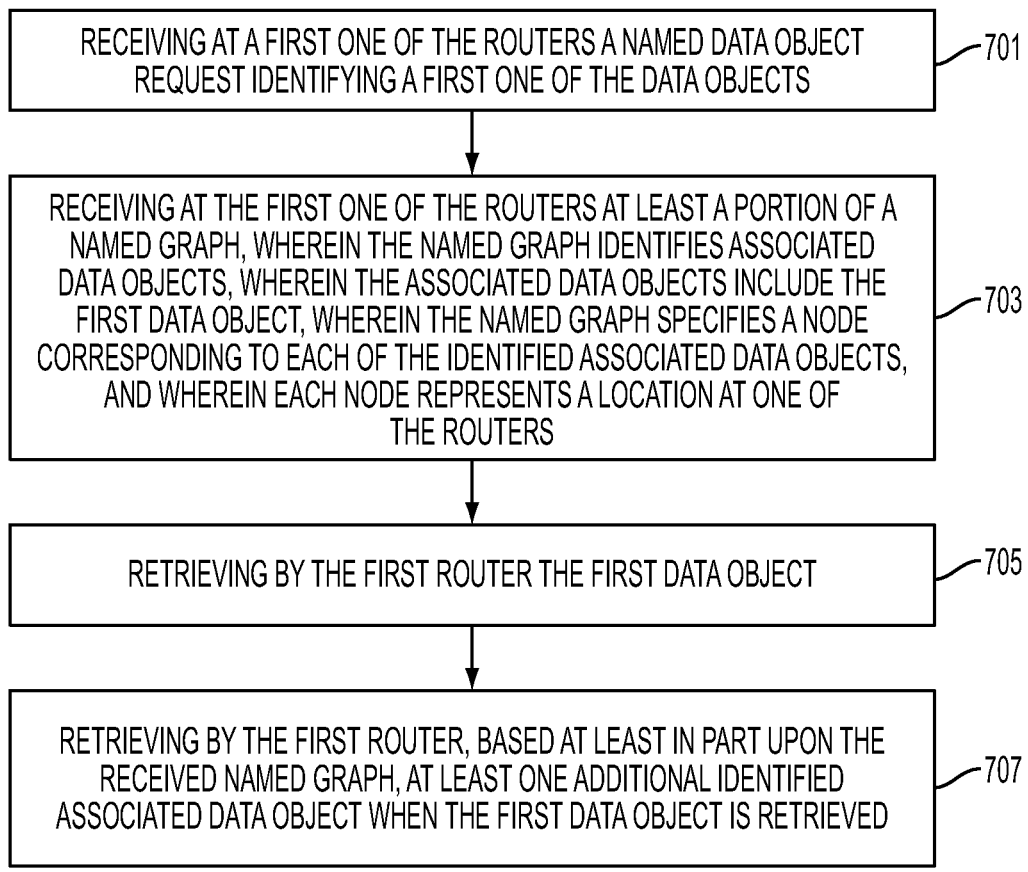
FIG. 7 depicts a flowchart of a method according to an embodiment of the present invention.

Referring now to FIG. 7, a method implemented in a computer system (or network) for accessing data objects in a named data network including a plurality of routers is shown. As seen in this FIG. 7, the method comprises: Step 701—receiving at a first one of the routers a named data object request identifying a first one of the data objects; Step 703—receiving at the first one of the routers at least a portion of a named graph, wherein the named graph identifies associated data objects, wherein the associated data objects include the first data object, wherein the named graph specifies a node corresponding to each of the identified associated data objects, and wherein each node represents a location at one of the routers; Step 705—retrieving by the first router the first data object; and Step 707—retrieving by the first router, based at least in part upon the received named graph, at least one additional identified associated data object when the first object is retrieved. In one embodiment, the retrieval by the first router of at least one additional identified associated data object does not need to be precisely simultaneously with regard to when the first object is retrieved.

In one example, any steps may be carried out in the order recited or the steps may be carried out in another order.

Figure 8:
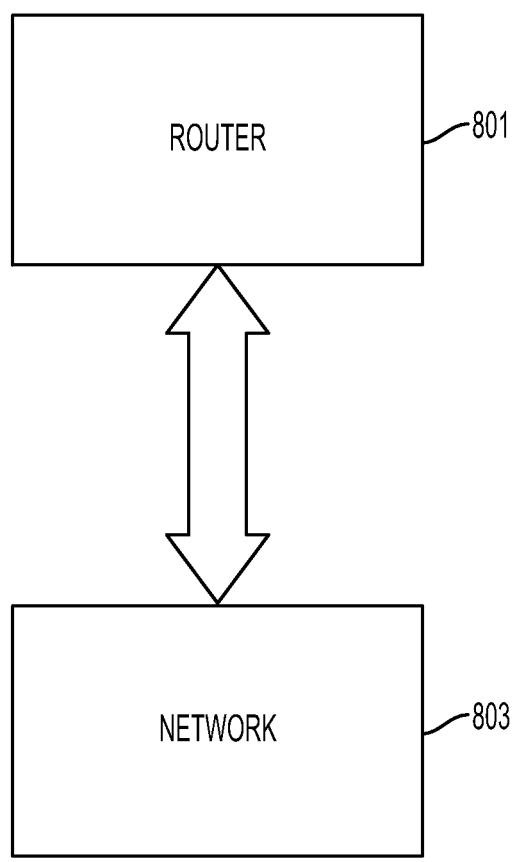
FIG. 8 depicts a block diagram of a system according to an embodiment of the present invention.

Referring now to FIG. 8, a computer-implemented system for aliasing data objects in a named data network including a plurality of routers is shown. As seen in this FIG. 8, the system includes a first router 801. The first router may be configured to detect a content of at least one named data object request for a first data object and a content of at least one response to the named data object request; and the first router may be configured to implicitly learn the first alias based at least in part upon the detected content.

Referring once again to FIG. 8, it is seen that this system may also (or in the alternative) provide for data object routing based on a named data object request in a named data network including a plurality of routers. That is, the first router 801 may be: configured to receive the named data object request; configured to determine if the data object named by the named data object request is in a cache of the first router; configured to respond with the data object named by the named data object request if the object named by the named data request is in the cache of the first router; configured to determine if an alias copy of the data object named by an alias associated with the named data object is in a cache of the first router and if the data object named by the named data object request is not in the cache of the first router; configured to respond with the alias copy if the data object named by the named data object request is not in the cache of the first router and if an alias copy of the data object named by an alias associated with the named data object is in the cache of the first router; configured to determine if a location of an alias copy of the data object at a second one of the routers is known if the data object named by the named data object request is not in the cache of the first router and if an alias copy of the data object named by an alias associated with the named data object is not in the cache of the first router; and configured to route the named data object request towards the location of the second router if the data object named by the named data object request is not in the cache of the first router and if an alias copy of the data object named by an alias associated with the named data object is not in the cache of the first router and if the location of the alias copy of the data object at a second one of the routers is known.

Referring once again to FIG. 8, it is seen that this system may also (or in the alternative) provide for accessing data objects in a named data network including a plurality of routers wherein the first router 801 may be: configured to receive a named data object request identifying a first one of the data objects; configured to receive at least a portion of a named graph, wherein the named graph identifies associated data objects, wherein the associated data objects include the first data objects, wherein the named graph specifies a node corresponding to each of the identified associated data objects, and wherein each node represents a location at one of the routers; configured to retrieve the first data object; and configured to retrieve, based at least in part upon the received named graph, at least one additional identified associated data object when the first data object is retrieved.

Still referring to FIG. 8, any communications may be carried out via network 803. Network 803 may comprise the Internet, an intranet, a local area network, a wide area network and/or any other desired communication channel(s).

Figure 9:
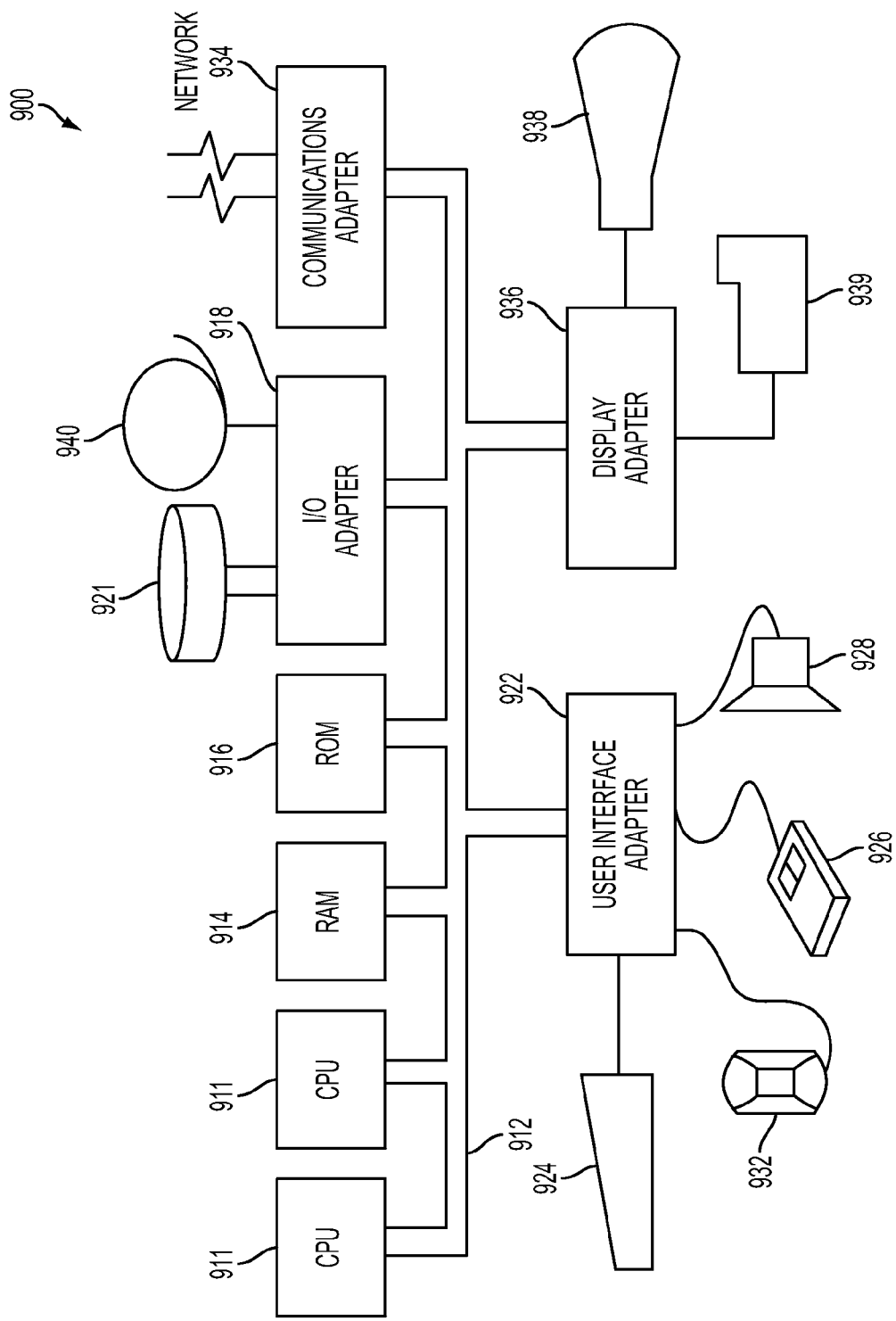
FIG. 9 depicts a block diagram of a system according to an embodiment of the present invention.

Referring now to FIG. 9, this figure shows a hardware configuration of computing system 900 according to an embodiment of the present invention. As seen, this hardware configuration has at least one processor or central processing unit (CPU) 911. The CPUs 911 are interconnected via a system bus 912 to a random access memory (RAM) 914, read-only memory (ROM) 916, input/output (I/O) adapter 918 (for connecting peripheral devices such as disk units 921 and tape drives 940 to the bus 912), user interface adapter 922 (for connecting a keyboard 924, mouse 926, speaker 928, microphone 932, and/or other user interface device to the bus 912), a communications adapter 934 for connecting the system 900 to a data processing network, the Internet, an intranet, a local area network (LAN), etc., and a display adapter 936 for connecting the bus 912 to a display device 938 and/or printer 939 (e.g., a digital printer or the like).

Figure 10:
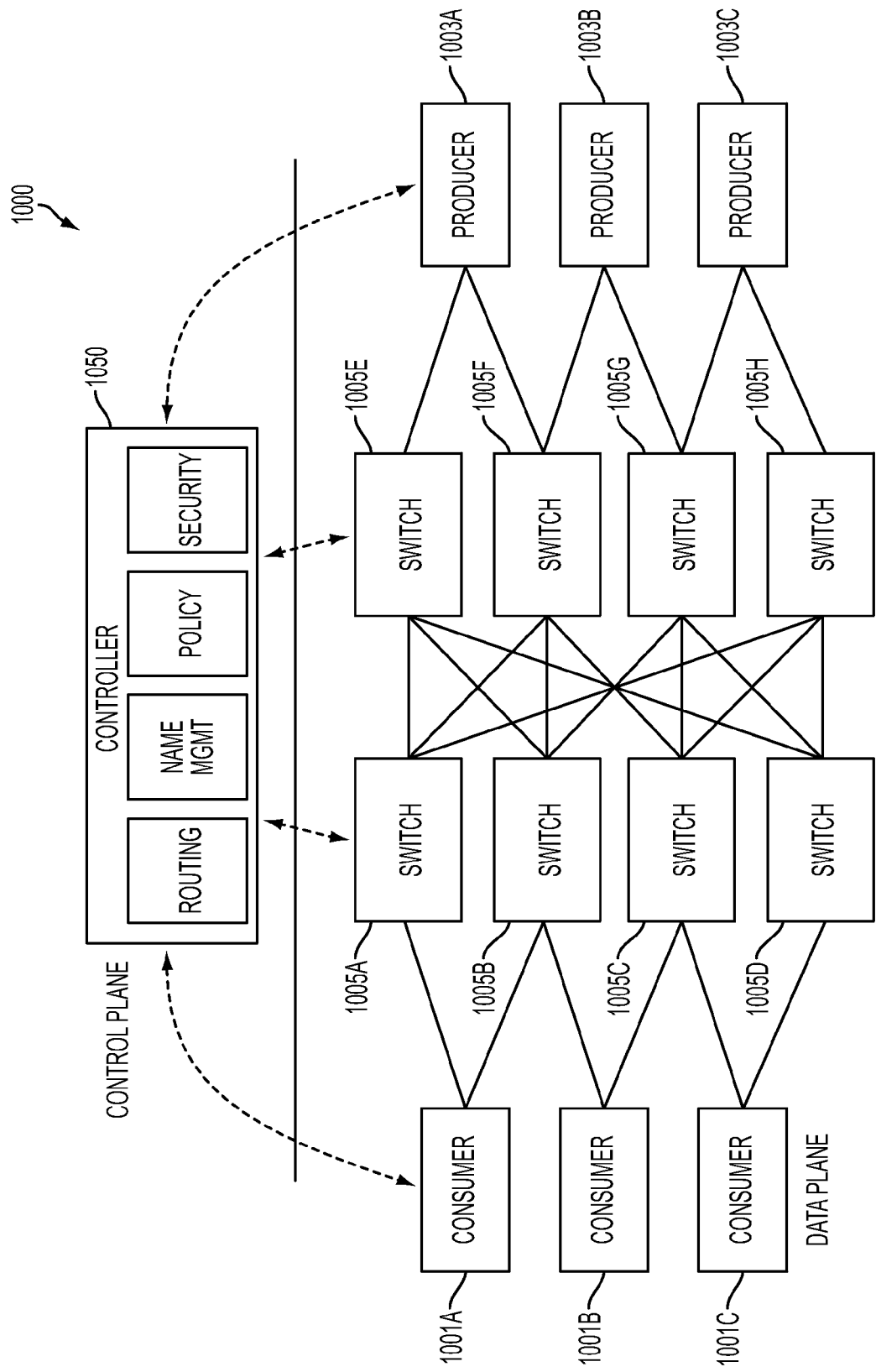
FIG. 10 depicts a block diagram of a system according to an embodiment of the present invention.

Referring now to FIG. 10, an example named data networking architecture 1000 according to an embodiment is shown. As seen in this example, consumers 1001A, 1001B and 1001C interact with producers 1003A, 1003B and 1003C via switches (or routers) 1005A, 1005B, 1005C, 1005D, 1005E, 1005F, 1005G and/or 1005H.

Further, controller 1050 may include mechanisms for providing routing, name management, policy and/or security.

Still referring to FIG. 10, communication (e.g., requests, responses, data objects) between and among the various entities (indicated by the solid lines between the entities) may be bi-directional. Further, communication between and among the various entities and the controller 1050 may be bi-directional (of note, controller 1050 may communicate with any desired number of consumer(s), switch(es), router(s) and/or producer(s)). Further still, the communication may be carried out via the Internet, an intranet, a local area network, a wide area network and/or any other desired communication channel(s).

Of note, while FIG. 10 shows the various entities communicating, it is to be understood that this FIG. 10 is actually referring to communication by computer system(s) or the like that are owned, leased, operated, used by, in the possession of and/or controlled by each of the entities.

In one embodiment, a method implemented in a computer system for aliasing data objects in a named data network including a plurality of routers, wherein at least a first one of the data objects is associated with at least a first alias, is provided, the method comprising: detecting by a first one of the routers a content of at least one named data object request for the first data object and a content of at least one response to the named data object request; and implicitly learning by the first router the first alias based at least in part upon the detected content of at least one of the request and the response.

In one example, the method comprises associating the first data object with the first alias.

In another example, the associating comprises registration of the first alias with a name management server.

In another example, the method further comprises propagating the first alias to at least a second one of the routers.

In another example, the request and the response are routed through the first router.

In another example, the implicitly learning is based upon at least one of: (a) a determination of data object signatures associated with the detected content; and (b) a query normalization associated with the detected content.

In another embodiment, a method implemented in a computer system network for data object routing based on a named data object request in a named data network including a plurality of routers is provided, the method comprising: receiving at a first one of the routers the named data object request; determining by the first router if the data object named by the named data object request is in a cache of the first router; if the data object named by the named data object request is in the cache of the first router, responding by the first router with the data object; if the data object named by the named data object request is not in the cache of the first router, determining by the first router if an alias copy of the data object named by an alias associated with the named data object is in the cache of the first router; if the data object named by the named data object request is not in the cache of the first router and if an alias copy of the data object named by an alias associated with the named data object is in a cache of the first router, responding by the first router with the alias copy; if the data object named by the named data object request is not in the cache of the first router and if an alias copy of the data object named by an alias associated with the named data object is not in the cache of the first router, determining by the first router if a location of an alias copy of the data object at a second one of the routers is known; and if the data object named by the named data object request is not in the cache of the first router and if an alias copy of the data object named by an alias associated with the named data object is not in the cache of the first router and if the location of the alias copy of the data object at the second one of the routers is known, routing by the first router the named data object request towards the location of the second router.

In one example, the method further comprises: if the data object named by the named data object request is not in the cache of the first router, determining by the first router if a location of the data object named by the named data object request at a third one of the routers is known; wherein, if the location of the data object named by the named data object request at the third one of the routers is known and if the location of the third router is closer to the first router than the location of the second router, then: routing by the first router the named data object request towards the location of the third router instead of the location of the second router.

In another embodiment, a method implemented in a computer system for accessing data objects in a named data network including a plurality of routers is provided, the method comprising: receiving at a first one of the routers a named data object request identifying a first one of the data objects; receiving at the first one of the routers at least a portion of a named graph, wherein the named graph identifies associated data objects, wherein the associated data objects include the first data object, wherein the named graph specifies a node corresponding to each of the identified associated data objects, and wherein each node represents a location at one of the routers; retrieving by the first router the first data object; and retrieving by the first router, based at least in part upon the received named graph, at least one additional identified associated data object when the first data object is retrieved.

In one example, the first router receives the entire named graph.

In another example, the method further comprises making at least one routing decision by the first router based at least in part upon the received named graph.

In another embodiment, a computer readable storage medium, tangibly embodying a program of instructions executable by the computer for aliasing data objects in a named data network including a plurality of routers, wherein at least a first one of the data objects is associated with at least a first alias, is provided, the program of instructions, when executing, performing the following steps: detecting by a first one of the routers a content of at least one named data object request for the first data object and a content of at least one response to the named data object request; and implicitly learning by the first router the first alias based at least in part upon the detected content of at least one of the request and the response.

In one example, the program of instructions, when executing, further performs the step of associating the first data object with the first alias.

In another example, the associating comprises registration of the first alias with a name management server.

In another example, the program of instructions, when executing, further performs the step of propagating the first alias to at least a second one of the routers.

In another example, the request and the response are routed through the first router.

In another example, the implicitly learning is based upon at least one of: (a) a determination of data object signatures associated with the detected content; and (b) a query normalization associated with the detected content.

In another embodiment, a computer readable storage medium, tangibly embodying a program of instructions executable by the computer for data object routing based on a named data object request in a named data network including a plurality of routers is provided, the program of instructions, when executing, performing the following steps: receiving at a first one of the routers the named data object request; determining by the first router if the data object named by the named data object request is in a cache of the first router; if the data object named by the named data object request is in the cache of the first router, responding by the first router with the data object; if the data object named by the named data object request is not in the cache of the first router, determining by the first router if an alias copy of the data object named by an alias associated with the named data object is in the cache of the first router; if the data object named by the named data object request is not in the cache of the first router and if an alias copy of the data object named by an alias associated with the named data object is in a cache of the first router, responding by the first router with the alias copy; if the data object named by the named data object request is not in the cache of the first router and if an alias copy of the data object named by an alias associated with the named data object is not in the cache of the first router, determining by the first router if a location of an alias copy of the data object at a second one of the routers is known; and if the data object named by the named data object request is not in the cache of the first router and if an alias copy of the data object named by an alias associated with the named data object is not in the cache of the first router and if the location of the alias copy of the data object at the second one of the routers is known, routing by the first router the named data object request towards the location of the second router.

In one example, the program of instructions, when executing, further performs the steps of: if the data object named by the named data object request is not in the cache of the first router, determining by the first router if a location of the data object named by the named data object request at a third one of the routers is known; wherein, if the location of the data object named by the named data object request at the third one of the routers is known and if the location of the third router is closer to the first router than the location of the second router, then: routing by the first router the named data object request towards the location of the third router instead of the location of the second router.

In another embodiment, a computer readable storage medium, tangibly embodying a program of instructions executable by the computer for accessing data objects in a named data network including a plurality of routers is provided, the program of instructions, when executing, performing the following steps: receiving at a first one of the routers a named data object request identifying a first one of the data objects; receiving at the first one of the routers at least a portion of a named graph, wherein the named graph identifies associated data objects, wherein the associated data objects include the first data object, wherein the named graph specifies a node corresponding to each of the identified associated data objects, and wherein each node represents a location at one of the routers; retrieving by the first router the first data object; and retrieving by the first router, based at least in part upon the received named graph, at least one additional identified associated data object when the first data object is retrieved.

In another example, the program of instructions, when executing, further performs the step of making at least one routing decision by the first router based at least in part upon the received named graph.

In one example, the first router receives the entire named graph.

In another embodiment, a computer-implemented system for aliasing data objects in a named data network including a plurality of routers is provided, the system comprising: a first router, wherein: the first router is configured to detect a content of at least one named data object request for a first data object and a content of at least one response to the named data object request; and the first router is configured to implicitly learn the first alias based at least in part upon the detected content of at least one of the request and the response.

In another embodiment, a computer-implemented system for data object routing based on a named data object request in a named data network including a plurality of routers is provided, the system comprising: a first router, wherein: the first router is configured to receive the named data object request; the first router is configured to determine if the data object named by the named data object request is in a cache of the first router; the first router is configured to respond with the data object named by the named data object request if the data object named by the named data request is in the cache of the first router; the first router is configured to determine if an alias copy of the data object named by an alias associated with the named data object is in a cache of the first router if the data object named by the named data object request is not in the cache of the first router; the first router is configured to respond with the alias copy if the data object named by the named data object request is not in the cache of the first router and if an alias copy of the data object named by an alias associated with the named data object is in the cache of the first router; the first router is configured to determine if a location of an alias copy of the data object at a second one of the routers is known if the data object named by the named data object request is not in the cache of the first router and if an alias copy of the data object named by an alias associated with the named data object is not in the cache of the first router; and the first router is configured to route the named data object request towards the location of the second router if the data object named by the named data object request is not in the cache of the first router and if an alias copy of the data object named by an alias associated with the named data object is not in the cache of the first router and if the location of the alias copy of the data object at a second one of the routers is known.

In another embodiment, a computer-implemented system for accessing data objects in a named data network including a plurality of routers is provided, the system comprising: a first router, wherein: the first router is configured to receive a named data object request identifying a first one of the data objects; the first router is configured to receive at least a portion of a named graph, wherein the named graph identifies associated data objects, wherein the associated data objects include the first data object, wherein the named graph specifies a node corresponding to each of the identified associated data objects, and wherein each node represents a location at one of the routers; the first router is configured to retrieve the first data object; and the first router is configured to retrieve, based at least in part upon the received named graph, at least one additional identified associated data object when the first data object is retrieved.

In other examples, implementation may be in the context of: (a) cloud computing; (b) platform as a service ("PaaS"); and/or (c) resource enablement (e.g., provisioning, deployment, elasticity and workload management).

As described herein, aliases may be learned from a variety of sources such as publisher published content, request-responses that the routers observe and query routing. In addition, requests may be routed based on the alias names and/or alias location.

As described herein, resolved relationships between named data objects in a static and/or dynamic graph in an NDN may be used to make routing decisions. In addition, name aliases may be communicated to NDN routers.

As described herein, the relationship of data objects may be used for better network utilization such as delay and caching efficiency. For example, by learning the relationship among multiple data objects, the network may be enabled to pre-fetch other related data objects when a request for a single data object is received, and hence the network response time can be greatly improved.

As described herein, mechanisms are provided for inferring and using the aliases of the data in a named data networking context.

As described herein, in various embodiments methodologies may be provided for aliasing of named data objects in a named data network. In one specific example, dynamic aliasing of named data objects may be provided.

As described herein, in various embodiments the relationship (e.g., dynamic relationship) between named data objects in the form of a named graph (e.g., that the network can fetch in anticipation of future requests) may be provided. In one specific example, such a named graph may be dynamically composed and the interconnections between entities can be dynamically modified representing new named data services.

As described herein, in various embodiments methodologies may be provided for performing routing and/or forwarding with execution at NDN brokers (e.g., making routing and/or forwarding decisions at NDN brokers).

As described herein, in various embodiments methodologies may be provided for aliasing named data objects within a named data networking system comprising the steps of: associating data objects with their syntactic and semantic aliases; publishing aliases and propagating the aliases to NDN routers; and implicitly learning aliases by observing data object requests and responses.

As described herein, in various embodiments methodologies may be provided for improving access to data objects within a named data networking system, comprising the steps of: identifying other named data objects associated with the data object; creating a named graph of associated data objects; retrieving one or more adjacent nodes in the named graph (or subgraph thereof) when one of the named nodes is accessed; and making routing decisions based on the named graph (or subgraph thereof) (and not on the named object alone).

As described herein, in various embodiments methodologies may be provided for aliasing named data objects and entities for named data networks. In one example: a producer publishes names and aliases; requestors can request original name or alias; brokers learn about aliases through route propagations and/or observing requests and responses; when data object request is made, brokers respond if data object name or alias is in cache; if not in cache, a routing request is made (e.g., to a central or distributed router) that routes to the closest data object (alias) location.

As described herein, in various embodiments methodologies may be provided for aliasing named data objects within a named data networking system comprising the steps of: associating data objects with their aliases (statically, using computed data object signatures and/or using query routing); publishing aliases and propagating the aliases to NDN routers; implicitly learning aliases by observing data object requests and responses.

As described herein, in various embodiments methodologies may be provided for data object routing based both on requested names and inferred object aliases. For example: if alias copy is in cache, respond with alias copy; if requested data object's location is unknown but the alias copy's is known, route the request to that location; if alias copy is in nearby location, route the request to that location.

In other examples, any steps, functions or the like described herein as performed by a router, may also (or instead) be performed by one or more servers, switches or the like.

As described herein, a router (e.g., an intermediate router) can infer and implicitly learn about an alias by observing the request-response sequence(s). For example, consider user requests for object O1 that is forwarded through router R towards the source. The source (and/or another intermediate router enroute) knows that O2 is an alias for O1 and responds to the request with O2. R observes this sequence and updates its local information with the newly learned alias for O1.

In another example, a process of "query normalization" may provide a query-name mapping service and may normalize different types of queries into standard data names (e.g., as specified by the naming structure of the network). For example, the naming structure could be the attributes of the data (e.g., weather), where attributes contain information about the data such as location, time, length, and organization, etc. In one embodiment, various types of queries can arrive at the network and request in essence the same data. For example, when a query of "Did it rain in Manhattan around 5 pm-6 pm" arrives at the network, the proxy may map the query into /location/time/condition and send the native named data request in the network. In this way, intermediate nodes which have local cached copy of the data by serving a previous query of "Was it sunny yesterday at NYC" can be utilized, and both the network response time and server traffic load can be reduced.

As described herein, a network switch has multiple interfaces, each with different network addresses. An "outgoing interface" is the switch interface on which an incoming packet will be forwarded. Similarly, an "incoming interface" is the switch interface on which the packet is received.

In other examples, embodiments may be applied to routing within a data center and/or to routing in any network in general (e.g., enterprise network, the Internet).

In other examples, any steps described herein may be carried out in any appropriate desired order.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A non-transitory computer readable storage medium, tangibly embodying a program of instructions executable by the computer for aliasing data objects in a named data network, the named data network including a plurality of routers for routing the data objects across the named data network, wherein at least a first one of the data objects is associated with at least a first alias, the program of instructions, when executing, performing the following steps:

detecting by a first one of the routers a content of at least one named data object request for the first data object and a content of at least one response to the named data object request, wherein the content of the at least one request comprises a name and the content of the at least one response comprises a semantic representation of the name; and implicitly learning by the first router the first alias based at least in part upon the detected content of at least one of the request and the response;

wherein the implicitly learning is based upon a query normalization associated with the detected content;

wherein the query normalization normalizes different types of queries into standard data names; and wherein the standard data names are specified by a naming structure utilized by the plurality of routers of the named data network.

2. The computer readable storage medium of claim 1, wherein the program of instructions, when executing, further performs the step of associating the first data object with the first alias.

3. The computer readable storage medium of claim 2, wherein the associating comprises registration of the first alias with a name management server.

4. The computer readable storage medium of claim 2, wherein the program of instructions, when executing, further performs the step of propagating the first alias to at least a second one of the routers.

5. The computer readable storage medium of claim 1, wherein the request and the response are routed through the first router.

6. The computer readable storage medium of claim 1, wherein the query normalization uses boolean expression simplification.

7. The computer readable storage medium of claim 1, wherein the naming structure comprises attributes of the data objects.

8. A computer-implemented system for aliasing data objects in a named data network, the named data network including a plurality of routers for routing the data objects across the named data network, the system comprising:

a first router, wherein:

the first router is configured to detect a content of at least one named data object request for a first data object and a content of at least one response to the named data object request, wherein the content of the at least one request comprises a name and the content of the at least one response comprises a semantic representation of the name; and the first router is configured to implicitly learn the first alias based at least in part upon the detected content of at least one of the request and the response;

wherein the implicitly learning is based upon a query normalization associated with the detected content;

wherein the query normalization normalizes different types of queries into standard data names; and wherein the standard data names are specified by a naming structure utilized by the plurality of routers of the named data network.

9. The system of claim 8, wherein the naming structure comprises attributes of the data objects.

10. A non-transitory computer readable storage medium, tangibly embodying a program of instructions executable by the computer for aliasing data objects in a named data network, the named data network including a plurality of routers for routing the data objects across the named data network, wherein at least a first one of the data objects is associated with at least a first alias, the program of instructions, when executing, performing the following steps:

detecting by a first one of the routers a content of at least one named data object request for the first data object and a content of at least one response to the named data object request, wherein the content of the at least one response comprises a name and the content of the at least one request comprises a semantic representation of the name; and implicitly learning by the first router the first alias based at least in part upon the detected content of at least one of the request and the response;

wherein the implicitly learning is based upon a query normalization associated with the detected content;

wherein the query normalization normalizes different types of queries into standard data names; and wherein the standard data names are specified by a naming structure utilized by the plurality of routers of the named data network.

11. The computer readable storage medium of claim 10, wherein the naming structure comprises attributes of the data objects.

12. A computer-implemented system for aliasing data objects in a named data network, the named data network including a plurality of routers for routing the data objects across the named data network, the system comprising:

a first router, wherein:

the first router is configured to detect a content of at least one named data object request for a first data object and a content of at least one response to the named data object request, wherein the content of the at least one response comprises a name and the content of the at least one request comprises a semantic representation of the name; and the first router is configured to implicitly learn the first alias based at least in part upon the detected content of at least one of the request and the response;

wherein the implicitly learning is based upon a query normalization associated with the detected content;

wherein the query normalization normalizes different types of queries into standard data names; and wherein the standard data names are specified by a naming structure utilized by the plurality of routers of the named data network.

13. The system of claim 12, wherein the naming structure comprises attributes of the data objects.

* * * * *